United States Patent Office

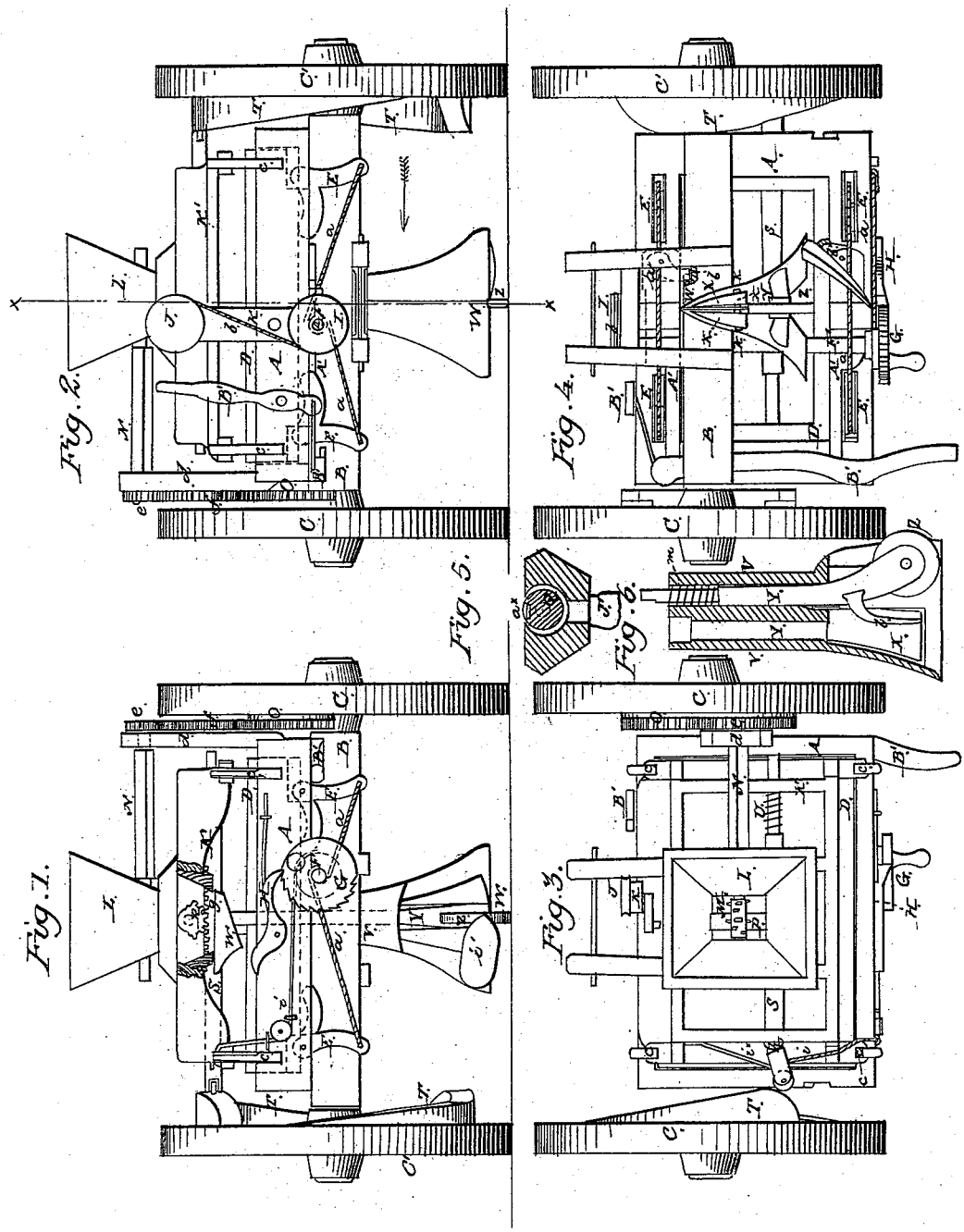

J. SHATTUCK, OF WATERLOO, NEW YORK.

Letters Patent No. 61,689, dated January 29, 1867

IMPROVEMENT IN SEED PLANTERS.

The Schedule referred to in these Letters Patent and making part of the same.

TO ALL WHOM IT MAY CONCERN:

Be it known that I, J. SHATTUCK, of Waterloo, in the county of Seneca, and State of New York, have invented a new and improved Seed Planter; and I do hereby declare that the following is a full, clear, and exact description thereof, which will enable those skilled in the art to make and use the same, reference being had to the accompanying drawings, forming part of this specification, in which—

Figure 1 is a rear view of my invention.

Figure 2, a front view of the same.

Figure 3, a plan or top view of the same.

Figure 4, an inverted plan of the same.

Figure 5, a transverse section of the seed-distributing cylinder pertaining to the same; and Figure 6, a vertical section of the hollow seed-conveying standard pertaining to the same, taken in the line $x\ x$, fig. 2.

Similar letters of reference indicate corresponding parts.

This invention relates to a new and improved machine for planting seed either in hills or drills, and it consists in a novel construction and arrangement of parts, as hereinafter fully shown and described, whereby the seed may be planted at the required depth in the soil, covered, and the earth drawn loosely upon it, all the parts being operated automatically or under the draught movement of the machine.

A represents a rectangular frame, which is secured upon an axle, B, having wheels C C on its ends. The thills or draught-pole bounds are attached to the axle B. D represents a rectangular frame, which is fitted within the frame A, and is allowed to slide freely up and down therein. This frame D may be raised within the frame A, and retained at a greater or less height by means of four bent levers, E, one at each corner or angle of the frame A, the lower ends of said levers being connected by cords $a$ to a shaft, F, underneath the frame A, and having its bearings attached thereto. This shaft F has a longitudinal position in the machine, and to its rear end there is attached a ratchet, G, with which a pawl, H, on the rear end of the frame A engages. To the front end of the shaft F there is attached a pulley, I, to which, and a pulley, J, on an upright, K, at the front end of frame A, a cord or belt $b$ is attached. The shaft F may be turned, and the levers E actuated so as to adjust the frame D at the desired height, by turning either the ratchet G or the pulley J, the latter being turned when the driver is riding on the machine, and the former when the driver is walking behind it. This will be fully understood by referring to figs. 1 and 2. K is a horizontal frame, which is a short distance above the frames A D, and is supported by uprights $c$ attached to the frame A, near the angles or corners of the same. This frame K supports the hopper I, in the lower part of which there is a toothed cylinder, M, the shaft N of the latter having its outer bearing in an upright, $d$, attached to one side of the frame A. The outer end of the shaft N has a pinion, $e$, upon it, with which a toothed wheel, $f$, gears, and to the inner side of the wheel C there is secured a toothed segment O which gears into the wheel $f$ as the machine is drawn along, the segment O operating the wheel $f$ intermittingly, and consequently giving the same movement to the toothed cylinder M. In the bottom of the hopper I there is a slide, P, having a hole or opening in it to allow the seed to pass through, and underneath the slide P there is a cylinder, Q, having a hole or chamber, $a^x$, made in it to receive the seed from the hopper and discharge the same. (See fig. 5.) This cylinder is operated by having a toothed segment, R, at its rear end, into which a rack, $g$, on a slide-rod, S, gears. This rod S has its bearings in the frame K, and it is moved in one direction by cams T on the wheel $C^1$, and moved in the other direction by a spiral spring, U. The slide-rod S, near the end against which the cams T act, is provided with a joint, $h$, and said end has a cord or strap, $i$, attached to it, which extends down back of the frame A and is attached to the shaft F. By turning the shaft F sufficiently, it will be seen that the jointed end of the slide-rod S may be drawn back so that the cams T cannot act against it, and said slide will therefore be rendered inoperative. A spring, $i^x$, is attached to the jointed end of S to prevent said end from casually moving out of proper position. V represents a foot or hollow standard, which is attached to the frame D, and has its lower end formed so as to operate as a share or furrow opener, W, and the latter has one or two wings $i^1$ attached to its rear side to serve as coverers. This hollow standard is connected at its upper end to the lower part of the hopper by an elastic tube, $j$, to compensate for the rising and falling of the frame D. Within the lower part of the standard V there are placed two valves, X X, which have springs $k$ bearing against them to retain them in a closed state, and Y is a vertical sliding-rod, fitted within the standard, and having a roller, Z, at its lower end. The rod Y has an arm, $l$, projecting from it, which passes between the valves X X, and a spring, M, is attached to the rod Y, said spring having a tendency to keep the rod pressed upward. The slide-rod S is provided with an inclined plane, $n$, which acts upon the upper end of the rod Y, and forces said rod downward, so that the roller Z will bear or press upon the dropped seed and press the latter into the earth, the spring $m$ forcing the rod upward when the inclined plane passes its upper end. The seed is discharged from the chamber $a^\times$ of cylinder Q into the hollow standard V as the spring U moves the slide-rod S, and the seed passes down between the valves X X, which retain it until the cams T move the rod S in the opposite direction, when the rod Y is forced down, and the arm $l$ of said rod opens the valves and the seed drops into the furrow; the cylinder Q, during this latter movement of the slide-rod S, being turned so that the chamber $a^\times$ will be uppermost or at the top of the cylinder to again receive the seed. The toothed cylinder M is used in connection with the seed-dropping cylinder Q in case cotton seed is being planted, or other seed which is liable to clog in the hopper. In planting seed in drills or continuous rows, the cylinder Q may be removed, the toothed cylinder M discharging the seed, and the slide P being in the hopper. This slide is withdrawn when the cylinder Q is used alone. By turning the shaft F and raising the frame D, the furrow-opener may be adjusted higher or lower as desired, according to the depth of furrow required, and by turning said shaft sufficiently far to actuate the cord or strap $i$, the slide-rod S may be rendered inoperative whenever required, and the frame D may be prevented from casually rising by means of slide-bars A' underneath, the frame A having catches $b^\times$ attached and actuated by levers B'.

Having thus described my invention, what I claim as new, and desire to secure by Letters Patent, is—

1. The rising and falling or adjustable frame D placed within the frame A, and having the hollow standard V attached, all arranged to operate substantially as and for the purpose set forth.

2. The reciprocating slide-rod S, operated by the cams T on the wheel C and the spring U, and provided with the rack $g$, in combination with the toothed segment R and the seed-dropping cylinder Q, all arranged substantially as and for the purpose specified.

3. The intermittingly rotating toothed cylinder M, operated from the wheel C through the medium of the gearing, as shown, in combination with the hollow standard V attached to the adjustable frame D, substantially as and for the purpose set forth.

4. The sliding-rod Y, provided with the roller Z, spring $m$, and arm $l$, and placed within the hollow standard V, and operated from the sliding-rod S, as shown, in combination with the valves X X placed within the standard, substantially as and for the purpose specified.

J. SHATTUCK.

Witnesses:
 FRANCIS F. WARNER,
 S. R. TEN EYCK.